United States Patent [19]
Finley et al.
[11] Patent Number: 4,987,429
[45] Date of Patent: Jan. 22, 1991

[54] ONE-PUMP COLOR IMAGING SYSTEM AND METHOD

[75] Inventors: Ronald B. Finley, San Francisco; Gene F. Day, Hillsborough; David J. Devine, San Jose, all of Calif.

[73] Assignee: Precision Image Corporation, Redwood City, Calif.

[21] Appl. No.: 460,735

[22] Filed: Jan. 4, 1990

[51] Int. Cl.[5] ...................... G01D 15/06; G03G 25/00

[52] U.S. Cl. .................................... 346/157; 346/1.1; 355/307

[58] Field of Search ............................... 346/157, 1.1; 355/296–307

[56] References Cited

U.S. PATENT DOCUMENTS 4,449,475 5/1984 Schinke .
4,591,543 5/1986 Outsuka et al. .
4,627,705 12/1986 Landa et al. .
4,767,689 8/1988 Bibl et al. .
4,796,051 1/1989 Monkelbaan et al. .
4,800,839 1/1989 Ariyama et al. .
4,801,965 1/1989 Mochizuki et al. .
4,895,103 1/1990 Day ................................ 355/307 X

*Primary Examiner*—George H. Miller, Jr.
*Attorney, Agent, or Firm*—Thomas Schneck

[57] ABSTRACT

A simplified color printing system and method is disclosed in which the printing system has a single applicator that is supplied with toner fluids or inks of different colors. The printing system is simplified by having a single pump employed in association with the applicator. Use of a single pump is made possible, because during a color change the pump and applicator are purged with air both before and after a wash fluid is circulated. The single pump is used to pump both the imaging fluids and the air. The present invention has application in both color electrostatic printers and copiers, and in color ink-jet printers.

18 Claims, 2 Drawing Sheets

ONE-PUMP COLOR IMAGING SYSTEM AND METHOD

DESCRIPTION

1. Technical Field

The present invention relates to color printing and in particular to color printing systems and methods of electrophotographic color printing and copying.

2. Background Art

In color printing and copying, there are classes of recording systems which employ multiple toner applicators, one for each color. Systems of this type often have a substantial number of mechanical parts which are subject to breakdowns and need frequent cleaning and maintenance. Such dedicated one per color applicators, when used for liquid toning, tend to dry out between uses. This leaves an insoluble buildup on surfaces which must be manually removed by frequent cleaning.

In view of the above problems with multi-applicator systems and in view of the continuing design goal of reducing the size of printers and copiers, single applicator systems were developed. These systems simplify the mechanics somewhat and reduce the size of such systems, but suffer from problems of cross-mixing of colors. The cross-mixing problems occur because liquid toners or inks of different colors are supplied to the same applicator. Thus, there is a common volume which the different liquids share and in which they become intermixed. Washing fluid is used to clean the common volume between successive color posses but wash fluid/toner mixing still leads to gradual cross-contamination of the colors. Color intermixing results in poor imaging manifested by loss of color saturation. This is especially critical in electrostatic printing where the liquid toners have a very delicate chemical balance. How this problem has been previously addressed in electrostatic printing is discussed below.

Multi-color electrostatic printers having a single applicator typically store liquid toner in storage tanks, one for each desired color. The different liquid toners are selectively supplied by pumps to the applicator as needed. A separate pump is used for each liquid toner. Usually, any excess toner is returned to the appropriate supply tank for reuse. Common methods for reducing color intermixing in this type of imaging system are to clean the applicator prior to supplying the applicator with toner of another color. Typically this is done either by pumping a wash fluid through the applicator and returning the wash fluid to a storage tank, or by washing the applicator at a cleaning station. A filter may be used to remove toner particles from the wash fluid so that the wash fluid may be reused.

The above methods of cleaning the applicator with a wash fluid have reduced the problem of color intermixing, but nonetheless some intermixing of toners still occurs. Furthermore, the cleaning apparatus is still fairly complex and subject to mechanical breakdowns and variations in performance. Breakdowns and the need for frequent servicings are both very inconvenient and expensive. It is not unusual for a service contract on a color printer to cost as much as the machine itself. Thus, cost, print quality, reliability, consistent performance and compactness are all major concerns in electrostatic printing.

It is therefore an object of the present invention to design a compact electrostatic printer which produces high quality color prints.

It is a further object of the present invention to design an electrostatic printer that is mechanically simple and highly reliable.

It is yet a further object of the present invention to provide a method of supplying imaging fluids of different colors to a single-applicator printing system in a manner which significantly reduces the risk of image-affecting intermixing of colors.

SUMMARY OF THE INVENTION

The above objects have been met by a color printing system which substantially reduces the number of mechanical components and reduces the effective "common volume", i.e., that volume of fluid passageways through the system which is shared by various colored fluids. The system has a single applicator associated with a single pump for applying different toner fluids to a recording surface. There are at least two toner fluids, each having a different color stored in storage vessels. A wash fluid is also provided and is stored in a storage vessel. A supply of a gas, typically air, is also provided. Each of these fluids, i.e., toner, wash fluid and air, is an input into a supply selector. The selector has a single output line that leads to the pump through which one of the fluids is selectively supplied to the pump. Between color changes, the pump is supplied with air to purge the common volume of the prior toner fluid, whereafter the pump is supplied with wash fluid to clean the pump and applicator. The pump is then supplied again with air to purge the wash fluid from the common volume. This process effectively reduces the common volume so that very little intermixing of colors occurs. This reduction in common volume enables the pump itself to be introduced into the common volume. This leads to the pump being cleaned between color passes. Thus a single supply pump can be used for any number of colors.

An advantage of the present invention is that the number of mechanical components is greatly reduced. A single pump replaces the multi-pump method. This means that reliability and reproducibility are improved. Reliability is improved because there are fewer mechanical parts and, therefore, breakdowns are less likely to occur. Reproducibility is improved because there is less color intermixing. This results in improved consistency and print quality.

Another advantage of the present invention is that purging the applicator with air both before and after rinsing with a wash fluid significantly reduces the intermixing of toner fluids. As a result of less intermixing, the toner fluids need to be replaced less frequently and the print quality is improved. Moreover, the combined advantages of less intermixing and simpler mechanics means that the present invention has less down time for maintenance and repairs. Also toner pumps tend to be large and heavy. The elimination of four such pumps provides benefits of cost, weight and size.

A key advantage of the present invention is that a compact design is achieved. Compactness is desirable since there is an increasing demand for small-sized printers and copiers. This is difficult to achieve in color printers because of their inherent complexity. The present design simplifies the apparatus and at the same time improves the print quality.

BEST MODE FOR CARRYING OUT THE INVENTION

Figure 1:
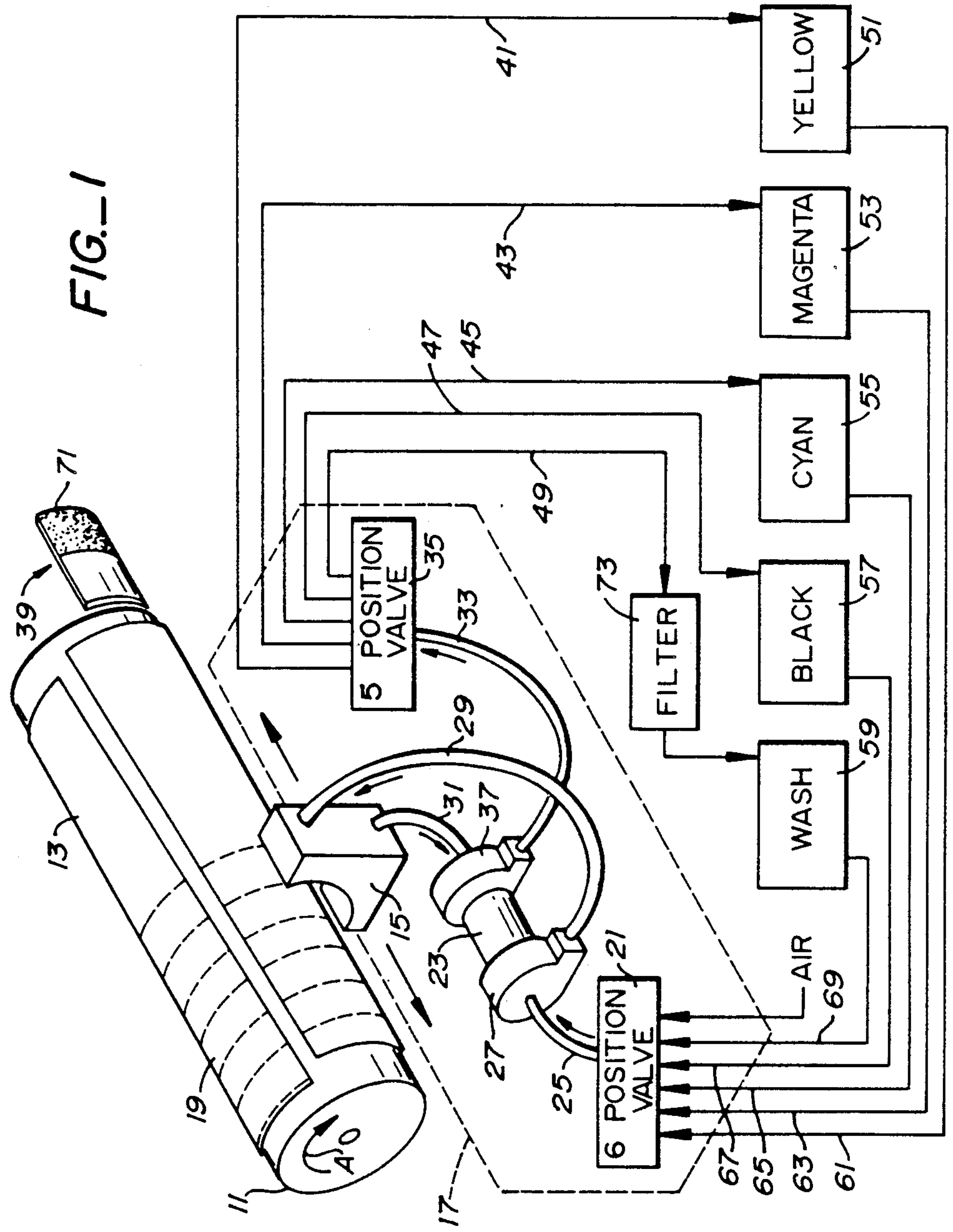
FIG. 1 is a simplified perspective view of a drum supported sheet and toning shoe assembly in accord with the present invention.

With reference to FIG. 1, a drum 11 may be seen supporting a sheet of paper 13 for rotation. While the drum rotates in the direction of arrow A, its axis is fixed so that the drum does not translate laterally. An electrostatic head, not shown, for creating an electrostatic latent image is in contact with the paper 13. The head is translated laterally, parallel to the axis of the drum 11. A toning shoe assembly 15 applies liquid toner to the electrostatic latent image existing in a charge pattern deposited onto the sheet. The liquid toner includes charged particles which are attracted to the charge pattern so as to develop the latent image. The toning shoe assembly follows the electrostatic head and together they move laterally and continuously so that a helical stripe pattern 19, indicated by dashed lines, is traced on sheet 13 by the lateral motion of the head and shoe on the one hand and the rotational motion of the drum on the other. A toning shoe contained in the shoe assembly 15 supplies toner locally to the sheet. Details of the toning shoe assembly and a carriage or shuttle subsystem, denoted by dashed line 17, are described in U.S. Pat. No. 4,767,689, assigned to the assignee of the present invention and incorporated by reference herein.

As noted, a toning shoe is one element of the shoe assembly 15. The shoe assembly 15 also includes means for removing and collecting excess developer and toner fluid from sheet 13. The toning shoe assembly 15 is fluidly coupled to a pump 23 and a supply selector 21, labeled in FIG. 1 as a six position valve. By way of example, solenoid valves which operate at about 5 pounds per square inch of fluid pressure could be used. Different colors of toning fluid as well as wash fluid are supplied through individual supply lines 61, 63, 65, 67 and 69 to the supply selector. These fluids are stored in supply tanks 51, 53, 55, 57 and 59, respectively. Ambient air is also supplied to the supply selector 21. The supply selector is controlled to provide a color toner, wash fluid or air to a common conduit 25. The common conduit 25 is connected to an inlet head 27 of the pump 23. The pump draws the selected liquid or air through the inlet head 27 of the pump and delivers that fluid, via conduit 29, to the toning shoe assembly. While the supply selector 21 and the pump 23 are shown separated from the toning shoe assembly 15 for illustrative purposes, in actual use these components may be integral with one another providing a compact structure and reduced common volume.

When the fluid selected is a toner fluid, it is applied to the sheet 13. Excess toner fluid is received by a collection device contained in the toning shoe assembly 15. The collected fluid is returned to the appropriate supply 51–57 of toner fluid via common drain tubes 31 and 33 connected to the outlet head 37 of the pump and a drain selector, labeled as a five position valve 35 in FIG. 1. The five position valve 35 is operated so that an appropriate return line 41, 43, 45 and 47 channels the collected toner fluid to its appropriate supply tank 51–57.

Also shown in FIG. 1 is a cleaning station 39 fixed at the edge of the drum 11. After completion of application of one toner color to the sheet 13, the pump and toning shoe are purged with air and then flushed with wash fluid, whereafter the pump and toning shoe are again purged with air. During the air purging, a blotter 71 may be used to capture any fluid droplets that are blown out of the toning shoe. When flushing the assembly, the wash fluid is collected and channeled to supply tank 59 via return line 49, as previously described in relation to the toner fluids. A filter 73 or other separation means, such as an electrostatic separator, may be used to remove toner particles from the wash fluid.

Figure 2:
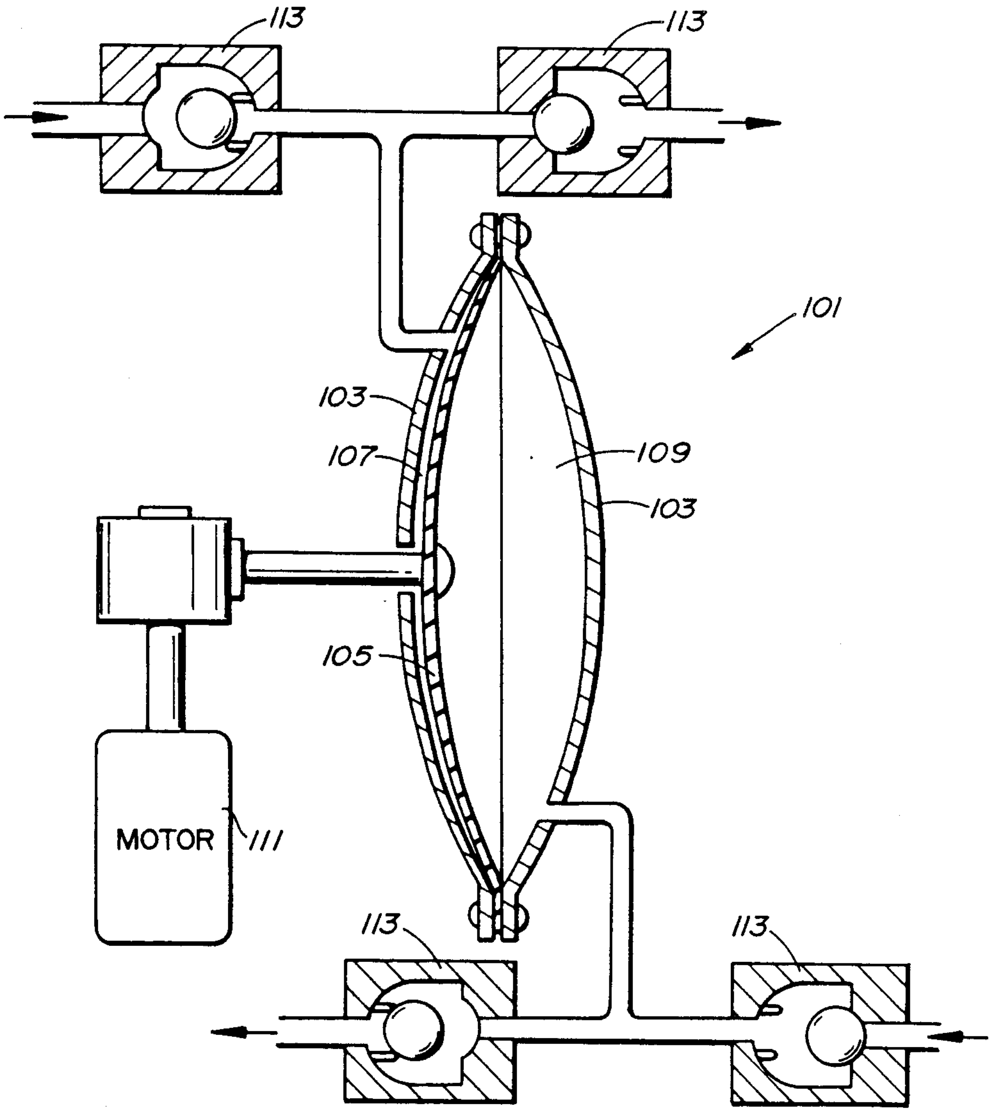
FIG. 2 is a side, partially sectional view of a diaphragm pump in accord with the present invention.

To achieve compactness, a single pump replaces the prior art multi-pump systems. Preferably the pump is a dual chamber diaphragm type pump since such a pump works well with both liquids and gases. A pump of this type is shown for illustrative purposes in FIG. 2. A diaphragm pump 101 is seen to include a housing 103 and a diaphragm 105 which separates the interior of the pump into an inlet chamber 107 and an outlet chamber 109. A motor 111 causes the diaphragm 105 to oscillate back and forth. Check valves 113 are used so that as fluid is being drawn into one chamber, fluid from the other chamber is being expelled. The check valves prevent fluid from flowing in an undesired direction. During color changes, the wash fluid cleans out the pump so that there is little cross-mixing even though the same pump is used for all of the color liquids.

As mentioned previously, the present invention involves using the same toning shoe to apply different colors of toner to an image. For example, the toning shoe may first supply a black color to the electrostatic latent image. A first color pass is accomplished by printing and toning a series of columns, which appear as helical stripes 19, in a scan-like manner. After one complete scan, or color pass, of sheet 13 by the electrostatic head and the toning shoe assembly 15, the toning shoe assembly is moved to the cleaning station 39. The assembly is purged with air, then rinsed with wash fluid, and purged with air a second time. This is accomplished by controlling the six-position valve 21 to first supply air to the pump, then wash fluid and then air. The wash fluid is supplied to the pump and toning shoe assembly from a supply tank 59. The wash fluid is collected in much the same manner as the excess liquid toners, after which the wash fluid is returned to its supply tank 59 for reuse. In this way the outlet head of the pump and common drain lines 31 and 33 are cleaned. Fluid expelled from the toning shoe by the air is collected and returned to its proper supply tank. Any droplets of toner or wash fluid created by the "bubbling" of the purge air may be simply absorbed by the replaceable blotter 71. After purging and rinsing, the toning shoe assembly is returned to the left side of drum 11 so that a second color pass may be performed. The toning shoe assembly 15 then successively supplies cyan, magenta, and yellow liquid developer to the latent image to produce a visible color image on the sheet. Between each color pass, the toning shoe assembly is purged and rinsed clean with wash fluid. After all the desired colors are applied, the paper sheet is released from the drum. The order in which the colors are successively applied may differ from the above. Moreover, colors other than those described above may be employed.

The imaging fluids used in the color imaging system above may be toner fluids or ink. In the case of toner fluids, an electrostatic printer apparatus which has a single applicator would be employed. For inks, an ink-jet printer apparatus could be used.

We claim:

1. A color system for producing an image on a surface of a recording medium comprising, a toner applicator, first means for delivering a toner liquid of a first color to the toner applicator, second means for delivering a toner liquid of a second color to the toner applicator, third means for delivering a wash liquid to the toner applicator, fourth means for delivering a purging gas to the toner applicator, selector means in fluid communication with each of said delivery means for selectively supplying one of said liquids and gas to the toner applicator.

2. The system of claim 1 wherein said purging gas is air.

3. The system of claim 1 futher comprising pump means in fluid communication with said selector means via a first common conduit and with said toner applicator via a second common conduit.

4. The system of claim 3 wherein said pump means comprises a single diaphragm pump having an inlet head and an outlet head.

5. The system of claim 3 further comprising a carriage supporting said toner applicator and said pump means, said carriage mounted for movement relative to said recording surface.

6. The system of claim 5 wherein said recording surface is supported on a drum.

7. The system of claim 5 further comprising, (i) means supported on said carriage for collecting excess toner liquid from said recording surface and for collecting wash liquid dispersed from said applicator, and (ii) liquid return means, communicating with the collecting means, for channelling the collected fluid to a selected one of a plurality of vessels.

8. The system of claim 7 wherein said pump means, said toner applicator and said means for collecting are combined as parts of a toning shoe assembly.

9. The system of claim 7 further comprising separation means for removing toner particles from said wash fluid, the separation means being disposed between said liquid return means and a wash liquid vessel.

10. An electrostatic color printing system comprising, a plurality of toner liquid vessels, each vessel containing a toner liquid having a different color, a source of gas, a vessel containing wash liquid, a carriage, a fluid selector means mounted on said carriage in fluid communication with each of said vessels and with said source of gas for selectively supplying one of the liquids and air to a common conduit, a pump mounted on the carriage, said pump having a first head connected to said common conduit and having a second head, a toning shoe assembly disposed on said carriage to apply toner fluid to a recording surface, said fluid selector means adapted to sequentially deliver said liquids and said air to said toning shoe assembly via the common conduit, said toning shoe assembly including means for collecting excess toner and wash liquid from the recording surface, said second head in fluid-receiving relation to said collecting means, and drain selector means in fluid communication with the second head of the pump to sequentially return the collected liquid to the respective vessel.

11. The system of claim 10 wherein said pump comprises a diaphragm pump.

12. The system of claim 10 further comprising separation means disposed between said drain selector means and said vessel containing wash liquid for removing toner particles from said wash liquid.

13. The system of claim 10 further including means for capturing and retaining purged liquid.

14. The system of claim 10 wherein said recording surface is supported on a drum.

15. A method for selectively applying imaging fluid in a color printing system having a single applicator, the method comprising the sequential steps of:

(a) providing a first toner fluid of a first color to said applicator in said color printing system, (b) performing a first color pass wherein the first toner fluid is applied to a surface, (c) supplying a gas to the applicator in a manner to purge the applicator with the gas to reduce the amount of the first toner fluid remaining in the applicator after completion of the first color pass, (d) supplying wash fluid to the applicator, (e) expelling the wash fluid from the applicator, (f) resupplying the gas to the applicator to purge the applicator of said wash fluid, (g) collecting and returning the wash fluid to a wash fluid storage vessel during steps (d)-(f), (h) performing a second color pass while providing a second toner fluid to said applicator, and (i) repeating steps (c)-(g) upon completion of said second color pass.

16. The method of claim 15 further comprising a combined step of collecting and returning excess first toner fluid to a first storage vessel, the combined step being performed concurrently with step (b).

17. The method of claim 16 further comprising the step of removing toner particles from said collected wash fluid prior to returning said wash fluid to said wash fluid storage vessel.

18. The method of claim 19 wherein said step of removing toner particles is accomplished by means of an electrostatic precipitator.

* * * * *

UNITED STATES PATENT AND TRADEMARK OFFICE

CERTIFICATE OF CORRECTION

PATENT NO. : 4,987,429

DATED : January 22, 1991

INVENTOR(S) : Ronald B. Finley et al.

It is certified that error appears in the above-identified patent and that said Letters Patent is hereby corrected as shown below:

Claim 18, column 6, line 55, "The method of claim 19" should read - -The method of claim 17- -.

Signed and Sealed this

Twenty-sixth Day of May, 1992

Attest:

DOUGLAS B. COMER

*Attesting Officer* *Acting Commissioner of Patents and Trademarks*